Feb. 21, 1956 W. BATTKE 2,735,360
LEMON SLICE SQUEEZERS
Filed Jan. 5, 1953
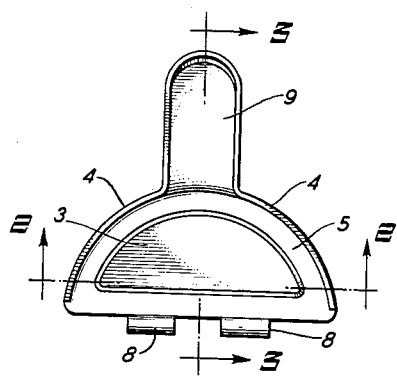
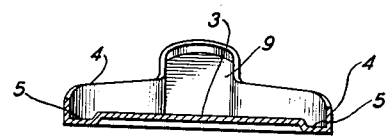
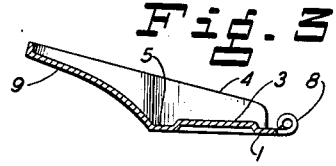
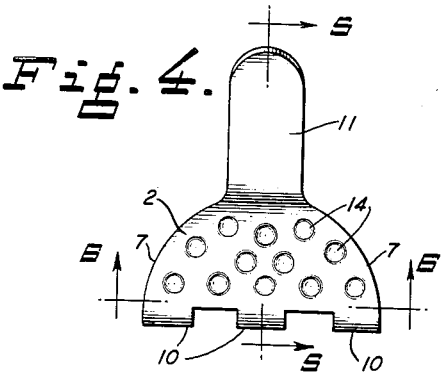
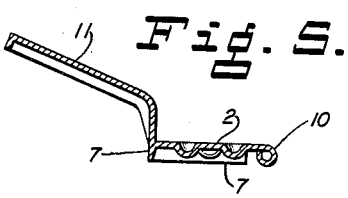
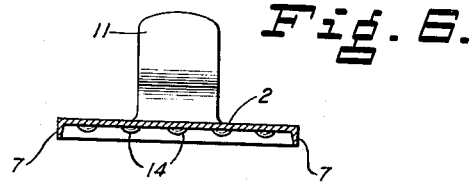
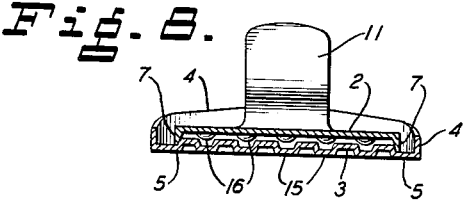
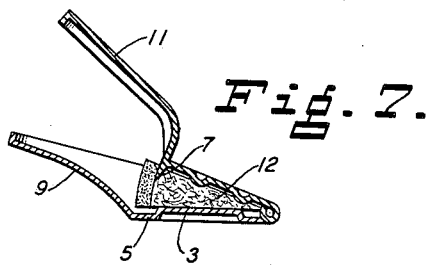
INVENTOR.
WILLI BATTKE
BY
ATTORNEY

United States Patent Office 2,735,360
Patented Feb. 21, 1956

2,735,360
LEMON SLICE SQUEEZERS

Willie Battke, Stuttgart-Oberturkheim, Germany, assignor to F. Ritter & Sohn, Munich-Pasing, Germany, a co-partnership Application January 5, 1953, Serial No. 329,589

1 Claim. (Cl. 100—234)

The invention concerns lemon slice squeezers consisting of two approximately semi-circular pressure plates which are connected together in a hinged form, on their straight longitudinal edges, and on each of their circumferential edges have a handle for the fingers exercising the pressure. In such lemon slice squeezers the circumferential edge of the lower pressure plate forming the base is curved upwards and presents a support for the back—formed by the peel—of the wedge-shaped lemon slice, whilst the circumferential edge of the smaller upper pressure plate, extends at such a distance from the edge of the lower pressure plate, that the peel of the inserted lemon slice finds room between the circumferential edges of the two pressure plates and the squeezing pressure is exercised only on the juicy flesh, but not on the peel.

The improvements according to the invention consist in the feature that the lower pressure plate, removed by the thickness of the peel, from its turned up edge, is raised on the inside so that the circumferential step formed by this provides a channel extending between the raised part of the base and the upwards curved edge of the squeezing plate, in which one edge of the peel of the lemon slice is inserted when it is squeezed. This not only provides a firmer purchase for the slice of lemon in the squeezing apparatus, but ensures that the juice is thoroughly squeezed out because the raised part of the lower plate penetrates into the juicy flesh and co-operates with the upper plate.

A further improvement in the squeezing out of the juicy flesh can be obtained in accordance with the invention by the feature that the circumferential edge of the upper pressure plate is directed downwards and constructed as a blade so that in squeezing it loosens the juice containing fruit-cells from the peel. In doing this it is immaterial if small parts of the white porous inner layer of peel is removed and squeezed off, as these soft parts of the peel neither hinder the squeezing pressure nor contain juice which could affect the flavour.

The construction of the lemon slice squeezer according to the invention ensures an easy and complete squeezing out of the juice even from slices of such lemons which have a particularly thick peel or the shape of which varies somewhat from the normal form in particular a withdrawal of the juicy flesh with the peel out of the operational range of the upper plate is avoided.

The lower pressure plate can also have a plurality of ledges extending parallel to each other, for instance cross bridges pressed inwards, between which juice discharge channels directed transversely to the hinging axis are formed. Corresponding projections provided in the upper squeezing plate can co-operate with the aforementioned channel, so that the squeezing action is further intensified on the juicy flesh.

The invention will be described further by way of example, with reference to the accompanying drawings, in which:

Fig. 1 is a plan view of the lower squeezing plate,
Fig. 2 is a section along the line II—II of Fig. 1,
Fig. 3 is a section along the line III—III of Fig. 1,
Fig. 4 is a plan view of the upper squeezing plate,
Fig. 5 is a section on the line V—V of Fig. 4,
Fig. 6 is a section along the line VI—VI of Fig. 4,
Fig. 7 shows the whole squeezer with lemon inserted, at the beginning of the squeezing operation in a vertical central section, and
Fig. 8 shows another embodiment of a lemon slice squeezer in a vertical section parallel to the hinging axis, similar to the method of illustration of Figs. 2 and 6.

The lower pressure plate 1 has hinge members 8 on its straight edge whilst the circumferential edge 4 of this plate is upwardly flanged. The central part 3 of the plate 1 is somewhat raised to define a flat pressing pleateau, so that between this part and the edge 4 a deepened channel 5 is formed the width of which corresponds to the thickness of the peel. A handle 9 is disposed centrally of the edge 4. The upper pressure plate 2 is equipped with hinged members 10 and the handle 11. Its circumferential edge 7 is curved downwards and constructed in the form of a blade. This edge 7 separates, as shown in Fig. 7, the flesh of the fruit 12 of the slice of lemon from the peel 13. At the same time, one edge of the peel is pressed into the channel 5 and the raised part 3 of the lower pressure plate co-operates with the upper pressure plate 2 to act on the juicy flesh of the slice of lemon. In the upper plate 2, cams 14 are pressed out in the known manner to assist the squeezing and firmly to secure the juicy flesh during the squeezing.

In the embodiment illustrated in Fig. 8, parallel grooves for the juice 15 are provided transversely to the hinge axis in the raised part 3 of the lower pressure plate and which co-operate with projections 16 disposed in corresponding series in the upper pressure plate 2.

I claim:

A citrus slice squeezer comprising a pair of opposed upper and lower pressure plates of substantially semi-circular shape when viewed in plan, said plates being hinged together along the chord portions thereof, and each being provided with a handle adapted to press the opposing surfaces of said plates together, the lower plate having a peripheral upturned flange and having a raised portion forming a flat pressing plateau with an arcuate rim concentric with and spaced from said upturned flange, to define a channel portion in said lower plate between said flange and rim, the upper plate having a peripheral downturned flange provided with a sharpened arcuate cutting edge, said cutting edge adapted to engage said lower plate in said channel portion below said plateau and being concentric with said upturned flange and spaced therefrom a radial distance corresponding in magnitude to the average thickness of a citrus peel, when said plates are pressed together, whereby said edge is adapted to sever the peel from the pulp portion of a citrus slice and only the pulp portion will be squeezed between the plates when pressed together.

References Cited in the file of this patent

UNITED STATES PATENTS

| | | |
|---|---|---|
| 216,699 | Reynolds | June 17, 1879 |
| 280,257 | Stein et al. | June 26, 1883 |
| 703,518 | Baumgarten | July 1, 1902 |
| 1,866,487 | Ritter | July 5, 1932 |
| 2,348,304 | Nudelman et al. | May 9, 1944 |
| 2,446,432 | Plaxco | Aug. 3, 1948 |
| 2,454,905 | Allen | Nov. 30, 1948 |

FOREIGN PATENTS

| | | |
|---|---|---|
| 38,639 | France | Mar. 24, 1931 |
| 138,633 | Austria | Aug. 25, 1934 |
| 978,903 | France | Nov. 29, 1950 |